United States Patent [19]
Graveland et al.

[11] 3,869,381
[45] Mar. 4, 1975

[54] PROCESS AND APPARATUS FOR CHEMICAL CONDITIONING OF WATER

[75] Inventors: Antonie Graveland, Maarsen; Wouter Louis Prinsen Geerligs, Amstelveen; Mohamad Ali Arafien Soleman, Amsterdam, all of Netherlands

[73] Assignee: Ingenieursbureau Dwars, Heederik en Verhey B.V., Amersfoort, Netherlands

[22] Filed: Mar. 28, 1973

[21] Appl. No.: 345,760

[30] Foreign Application Priority Data
Apr. 4, 1972 Netherlands .................... 720447

[52] U.S. Cl. .................. 210/20, 210/46, 210/51, 210/59, 210/205, 210/221, 210/268, 210/289, 210/291
[51] Int. Cl. ............................................ B01d 43/00
[58] Field of Search ....... 210/20, 42, 189, 190, 191, 210/205, 221, 265, 268, 519, 289, 291, 46, 51, 59; 55/77, 79, 390

[56] References Cited
UNITED STATES PATENTS

| | | | |
|---|---|---|---|
| 1,846,419 | 2/1932 | Itarwood et al. | 210/190 |
| 1,867,572 | 7/1932 | Johnson | 210/190 |
| 3,141,000 | 7/1964 | Turner | 210/519 |
| 3,481,868 | 12/1969 | Gilwood et al. | 210/20 |
| 3,740,330 | 6/1973 | Kneale | 210/53 |

Primary Examiner—Charles N. Hart
Assistant Examiner—F. F. Calvetti

[57] ABSTRACT

Water is conditioned by rendering it alkaline by addition of an alkali metal hydroxide in a grain reactor with a fluidized granular bed, in which reactor the water and the alkaline solution are introduced separately in such a manner that the outflow direction of the water forms an angle with the general current direction in the reactor and that the alkali metal hydroxide solution discharges into the reactor above the level of the water discharge openings. The hydroxide is preferably sodium hydroxide.

17 Claims, 3 Drawing Figures

PROCESS AND APPARATUS FOR CHEMICAL CONDITIONING OF WATER

BACKGROUND OF THE INVENTION

The invention relates to a process and an apparatus for chemical conditioning of water by rendering it alkaline and by removal of the hardness constituents.

For chemical conditioning of water, especially tap water, several chemical methods are known besides the ion exchange method, which is rather expensive and which creates problems because of the necessity to dispose of large amounts of regeneration liquid.

In the first place it is known to add lime milk to the water in the desired dosage, which water is present in large basins. The alkaline earth metal bicarbonates dissolved in the water thus precipitate as alkaline earth metal carbonates. The calcium ions added by the lime milk are also converted into calcium carbonate because of the bicarbonate and carbonate ions present. Thus the carbonate and bicarbonate ions are caught by the addition of lime milk, but the permanent hardness of the water, caused for instance by dissolved calcium and magnesium ions, is not influenced by the addition of lime milk. For removal of the still present calcium and magnesium ions soda is therefore added after the lime milk addition, this precipitating these ions as calcium carbonate or magnesium hydroxide. In this process the insoluble compounds obtained precipitate as a fine sludge, which should be left to settle down. The deposit obtained after separation from the conditioned water, however, still comprises large amounts of water, which are not easily removed, so that this process leads to relatively large amounts of waste sludge. Storage of these sludge masses or transport to other places constitutes a large problem, inherent to this process.

Therefore research was directed to processes in which the solids to be removed would not precipitate as a sludge, but as granular materials. These desired results appeared to be obtained in the so called crystallization method. In an embodiment of this process the water which is conditioned, is caused to flow upwardly from the apex shaped bottom of a conical reactor container. Perpendicular to the water stream and tangential to the wall of the container a lime milk is injected in the narrowest part of the bottom of the reactor. Thus there arises a helical current, providing a mixing effect for both currents. On addition of seeding material a major part of the hardness constituents, which are to be removed in the conditioning, and of the lime milk itself could be obtained as a granular material, which was easy to separate.

However, there still remained rather substantial amounts of sludge, because not all of the lime milk was taken up in the water in the reactor and part thereof left the reactor together with the purified water. These amounts of non-converted lime milk were indicated by the term "carry-over" and this carry-over is caused by the formation of calcium carbonate on the surface of the undissolved lime particles. This formation of calcium carbonate is reduced by preparation of the lime milk with carbonate-free water. However, it was still necessary to subject the water to an after-treatment for removal of the carry-over. This after-treatment is rather costly and provides rather large amounts of sludge, which still gives the known problems of disposal and/or transport.

Another and important objection, which is also inherent to the first mentioned method, resides in the use of the lime milk. Lime milk is produced from commercial lime and this method is troublesome, requires an extensive apparatus and is labor-consuming. Still another objection to the use of lime milk resides in the fact that the calcium ions introduced together with lime milk also precipitate because of the formation of the calcium carbonate. Thus the conditioned water obtained is very low in carbonate and bicarbonate ions, owing to which there is also no buffering action present in the water. Therefore the pH is already strongly lowered by the addition of small amounts of acidic substances, for instance dissolved $CO_2$, which makes the water corrosive. For tap water, which should be conveyed to the user through a tube system, this is a grave objection, which should be counteracted by the addition of buffer salts. For this purpose for instance, soda is used. However, by the addition of soda, the cost for chemicals will be rather high in the application of both of these above mentioned lime milk methods for conditioning of tap water.

Still another objection against the use of lime milk, which is a suspension of solid particles in water, is the plugging especially at the outlet openings, where also solid reaction products may arise. In order to meet this objection as far as possible wide conveyor tubes and outlet openings should be used.

As a further preponderate objection of the lime milk method should be mentioned the fact that the process is temperature-sensitive, that is that the conditioning effect decreases with decreasing temperature.

SUMMARY OF THE INVENTION

It was now found that it is possible in a simple manner to convert the hardness constituents of water into a granular crystalline product, which is suitable for several industrial applications, while this process is not subject to the above mentioned objections such as carry over, sludge formation, temperature sensitivity and additional additions of soda.

Thus the invention provides a process for chemical conditioning of water by rendering it alkaline in a grain reactor with a fluidized granular bed and removal of hardness constituents in granular form, wherein the alkaline substance added is an alkali metal hydroxide solution, while the water and the hydroxide solution are injected separately in the reactor in such a manner that the direction of the water stream forms an angle with the general direction of the main stream in the reactor and that the hydroxide solution flows out above the level of the water outlet openings. Preferably the angle between this outflow direction of the water and the general current direction is 90°. In another preferred embodiment of the process the hydroxide solution is introduced in the reactor within a ring of entering water streams. Usually there are applied several separate lye spray nozzles and several separate water spray nozzles.

In order to promote the crystallization of the hardness constituents to be removed in granular form a seeding material is brought in the reactor through an injection opening provided in the reactor above its bottom. Preferably this seeding material may comprise broken grains of the solid product obtained in the process itself.

It is observed that by using an alkali metal hydroxide solution especially a solution of caustic soda, the objections connected to the use of lime milk are immediately eliminated. It is very easy to dilute commercial caustic soda solution to 25% (freezing point -18°C) and the obtained solution may be completely free of floating solid particles. Therefore this hydroxide solution may flow through narrow channels if care is taken that the outlet openings cannot close because of precipitation of salts. The fact that commercial caustic soda solution almost always comprises mercury because of its production method is no objection in the method according to the application, not even when the purified water is to serve as drinking water, because it appeared that the mercury present in the caustic soda solution disappears very completely from the solution and is recovered substantially completely in the solid reaction product.

Obviously all alkali metal hydroxides may be used in the hydroxide solution according to the present application, but most of these hydroxides are too expensive for industrial application. In practice only caustic soda solution will be considered.

The invention also comprises an apparatus for chemical conditioning of water according to the above mentioned process, which reactor comprises a bottom in which at least one water spray nozzle is provided, the outlet channels of which are oriented in such a manner, that the center line of these channels forms an angle with the general current direction of the liquid in the reactor, and at least one hydroxide solution spray nozzle, the outlet channels of which are positioned at a higher level than the outlet channels in the water spray nozzle, calculated from the bottom. Preferably several separate hydroxide solution spray nozzles and several separate water spray nozzles are provided. Also the outlet channels of the hydroxide solution spray nozzles may be oriented in such a manner that their center line forms an angle with the general current direction of the liquid in the reactor. Preferably this angle is 90°. In a preferred embodiment the hydroxide solution spray nozzles are provided concentrically within a ring of water spray nozzles. At the bottom side the reactor may be provided with two separate chambers, one of which serves for feeding water and the other serves for feeding the hydroxide solution. These chambers are respectively connected with the water and hydroxide solution inputs of the spray nozzles provided in the bottom. The water chamber is preferably a chamber bordering the bottom, because the amount of water which is to be fed to the reactor is many times the amount of hydroxide solution which is to be added to this water.

Preferably the reactor may be shaped as a cylindrical container. Then both chambers are formed by two partitions within the container, and the spray nozzles are provided in the second partition above the container bottom, which second partition forms the factual reactor bottom, while the water inputs to the water spray nozzles are directly connected with the water tank immediately below and the hydroxide solution chamber situated below the water tank is connected with the hydroxide solution inputs to the spray nozzles by channels passing through the first chamber.

BRIEF DESCRIPTION OF THE DRAWING

The invention is now further explained with reference to the drawing and some examples.

DETAILED DESCRIPTION OF THE INVENTION

Figure 1:
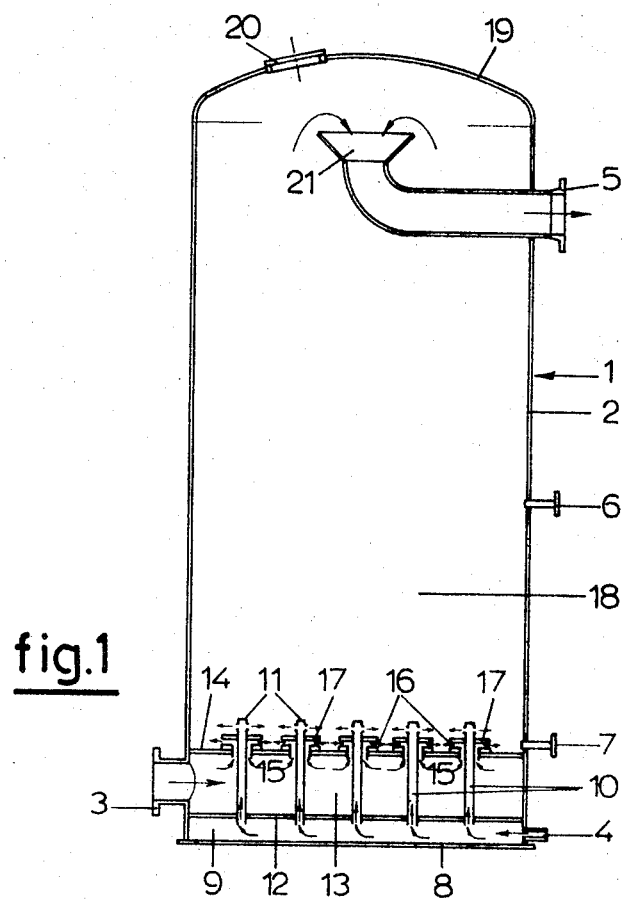
FIG. 1 is a vertical cross section through a preferred embodiment of a reactor according to the invention.

In FIG. 1 the reactor casing 1 comprises a vertical cylindrical wall 2, provided with respectively a water feed duct 3, a hydroxide solution feed duct 4, a water outlet duct 5, a feed duct for seeding material 6 and an outlet duct for granular precipitated material 7. The bottom 8 of the casing also forms the bottom of the hydroxide solution chamber 9, which is connected through lines 10 with the hydroxide solution spray nozzles 11. The hydroxide solution chamber is closed by the partition 12, sealingly fitted with lines 10. This partition 12 forms the bottom of the water chamber 13, the upper side of which is closed by a second partition 14, provided with water feeds 15. These water feeds 15 are in open connection with the water outlet openings 16 of the water spray nozzles 17. In the reactor space 18 between partition 14 and reactor cover 19 mixing takes place of the two liquids and thus the reaction takes place there, too, while a fluidized bed is formed of solid precipitated granular materials. In the cover 19, a control opening is provided with cover 20. The conditioned water above the fluidized bed is continuously removed through the overflow funnel 21.

Figure 2:
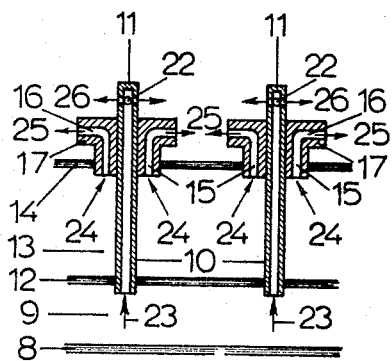
FIG. 2 is a vertical cross section through an embodiment of the spray nozzles provided in the reactor bottom of the reactor according to FIG. 1.

In FIG. 2 the spray nozzles of FIG. 1 are shown on an enlarged scale. The hydroxide solution chamber, the water chamber, the partitions and the hydroxide solution and water spray nozzles are indicated by the same reference numbers, respectively 9, 13, 8, 12, 14, 11 and 17. The direction of the currents of the hydroxide solution and of the water are shown with arrows. The hydroxide solution enters the feeding ducts 10 in the direction of the arrows 23. These ducts discharge into the spray nozzle heads 11, the sides of which are provided with several openings 22. Therefore the hydroxide solution discharges into the reactor space according to the arrows 26.

In a corresponding manner the water enters the feed openings 15 in the direction of the arrows 24 and discharges from the openings 16 in a direction indicated by the arrows 25. The discharging streams, both the hydroxide solution and the water streams, must therefore change their direction because of collision, causing heavy turbulence around the spray nozzles, thus promoting quick mixing. Because of the construction of the spray nozzles, causing separate discharge of the streams, however, adequate mixing will not take place immediately near the discharge openings themselves, which is very important in the prevention of plugging of the discharge openings.

Figure 3:
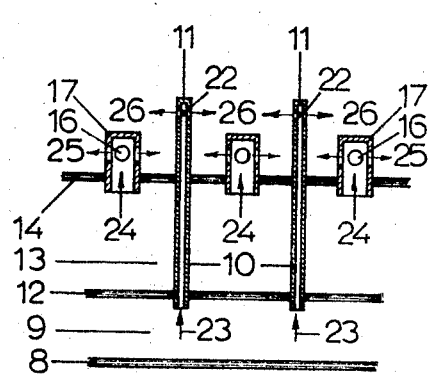
FIG. 3 is a vertical cross section through an alternative embodiment of the spray nozzles in the reactor according to the invention.

An alternative embodiment of the spray nozzle heads is indicated in FIG. 3. Now the hydroxide solution spray nozzles 11 are positioned in between the water spray nozzles 17, but still in such manner that no direct mixing will take place immediately near the discharge openings. The counterdirected partial streams 25, and 26 respectively also provide in this case the turbulence, which is necessary for an intensive mixing. The reference numbers in FIG. 3 are the same as in FIG. 2, indicating corresponding parts with the same number.

EXAMPLE I

Tap water with a total hardness (TH) of 15.7°D (1 mgmol/l $Ca^{++}$ and $Mg^{++}$ ions in water correspond to 5.6°D) and a bicarbonate content (BH) of 9.4°D (1 mgeq/l $HCO_3'$ corresponds to 2.8°D) was treated in a reactor according to the invention with 85 g sodium hydroxide for each $m^3$ of water. This provided a grain production of 191 $g/m^3$, while lowering the hardness to TH=5°D and BH=4°D.

For conditioning of the same tap water with $Ca(OH)_2$ as the base with addition of $Na_2CO_3$ it was calculated that the same hardness values would have been obtained with 79 g $Ca(OH)_2$ and 112 g $Na_2CO_3$. This would provide for a grain production of 297 $g/m^3$.

EXAMPLE II

In the same manner as in Example I tap water with TH=12.7°D and BH=11.2°D was treated with 60 g sodium hydroxide for each $m^3$ of water. This provided for a grain production of 137 $g/m^3$, whereas the hardness of the water sank to TH=5°D and BH=7.3°D.

For conditioning with $Ca(OH)_2$ and $Na_2CO_3$ it was calculated that 100 g $Ca(OH)_2$ and 19 g $Na_2CO_3$ would be necessary for each $m^3$ of water in order to obtain a TH of 5°D and a BH of 4°D. The grain production would have been in this case 274 $g/m^3$.

EXAMPLE III

In the same manner as in Example I a tap water with a TH=13.2°D and BH=9.8°D was treated with 67 g sodium hydroxide for each $m^3$ of water. This provided for a grain production of 146 $g/m^3$, whereas the hardness of the water sank to TH=5°D and BH=5.7°D.

For conditioning with $Ca(OH)_2$ and $Na_2CO_3$ it was calculated that 84 g $Ca(OH)_2$ and 160 g $Na_2CO_3$ would be necessary for each $m^3$ of water in order to obtain a TH of 5°D and a BH of 4°D. The grain production would have been in this case 260 $g/m^3$.

What we claim is:

1. A process for chemical conditioning of water containing hardness constituents comprising adding a solution of an alkali metal hydroxide to the water in a reactor with a fluidized granular bed and removing the hardness constituents in granular form, wherein the water and the alkali metal hydroxide solution are separately injected into the reactor in such a manner that the outflow direction of the water forms an angle with the general current direction in the reactor and the alkali metal hydroxide solution discharges above the level of the water discharge openings.

2. A process according to claim 1, wherein the alkali metal hydroxide is sodium hydroxide.

3. A process according to claim 1, wherein the alkali metal hydroxide solution and the water discharge into the reactor at several places simultaneously.

4. A process according to claim 3, wherein the alkali metal hydroxide is sodium hydroxide.

5. A process according to claim 3, wherein the water and the alkali metal hydroxide solution are injected into the reactor from the bottom.

6. A process according to claim 1, wherein the water and the alkali metal hydroxide solution discharge into the reactor at an angle with respect to the general current direction of the liquid in the reactor.

7. A process according to claim 6, wherein the angle between the discharge direction and the general current direction amounts to 90°.

8. A process according to claim 6, wherein the alkali metal hydroxide solution discharges into the reactor within a ring of discharged water streams.

9. A reactor for chemical conditioning of water with a solution of a chemical comprising a chamber adapted to maintain a fluidized granular bed, said chamber provided with a bottom inlet for the water, and a bottom inlet for the chemical solution, an upper inlet for the granular material constituting the fluidized bed, an upper outlet for the conditioned water and a bottom outlet for precipitated granular material, wherein the water inlet comprises at least one water spray nozzle having water discharge channels oriented in such a manner that the center line of these channels forms an angle with the general upward direction of water flow in the reactor and wherein the chemical solution inlet comprises at least one chemical solution spray nozzle having chemical solution discharge channels positioned at a higher level than the water discharge channels.

10. A reactor according to claim 9, wherein several separate hydroxide spray nozzles and several separate water spray nozzles are provided.

11. A reactor according to claim 10, wherein the discharge channels of the hydroxide solution spray nozzles are also oriented in such a manner that their center line forms an angle with the general current direction of the liquid in the reactor.

12. A reactor according to claim 10, wherein the angle between the center line of the discharge channels and the general current direction of the liquid in the reactor amounts to 90°.

13. A reactor according to claim 11, wherein the hydroxide solution spray nozzles are positioned concentrically within a ring of water discharge openings with respect to the general current direction of the liquid in the reactor.

14. A reactor according to claim 9, wherein the reactor is provided with two separate chambers at the bottom side, one of which chambers serves for feeding water and the other serves for feeding hydroxide solution, which chambers are respectively connected with water and hydroxide solution feeding lines to the spray nozzles provided in the bottom.

15. A reactor according to claim 14, wherein several separate hydroxide solution spray nozzles and several separate water spray nozzles are provided.

16. A reactor according to claim 14, wherein the water chamber adjoins the bottom of the reactor.

17. A reactor according to claim 16, wherein the reactor comprises a cylindrical container in which both chambers are formed by two partitions provided in the container, and wherein the spray nozzles are provided in the second partition above the container bottom, which second partition forms the factual reactor bottom, while the water feeding lines to the spray nozzles are directly connected with the water chamber immediately below and the hydroxide solution chamber which is below this water chamber is connected with the hydroxide solution feeding lines of the hydroxide solution spray nozzles through channels passing through the water chamber.

* * * * *